(12) United States Patent
Villarreal-Saucedo et al.

(10) Patent No.: US 7,778,303 B2
(45) Date of Patent: Aug. 17, 2010

(54) LASER HAVING DISTRIBUTED INDUCTANCES

(75) Inventors: Francisco J. Villarreal-Saucedo, Avon, CT (US); Jochen Deile, West Hartford, CT (US); Shadi Sumrain, Avon, CT (US); Viktor Granson, New Britain, CT (US); Peter Daniel, Farmington, CT (US)

(73) Assignee: Trumpf, Inc., Farmington, CT (US)

( * ) Notice: Subject to any disclaimer, the term of this patent is extended or adjusted under 35 U.S.C. 154(b) by 0 days.

(21) Appl. No.: 11/935,246

(22) Filed: Nov. 5, 2007

(65) Prior Publication Data

US 2009/0116531 A1 May 7, 2009

Related U.S. Application Data

(60) Provisional application No. 60/985,174, filed on Nov. 2, 2007.

(51) Int. Cl.
*H01S 3/03* (2006.01)
(52) U.S. Cl. .............................. 372/61; 372/64; 372/62; 372/55
(58) Field of Classification Search .................. 372/61, 372/64, 62, 55
See application file for complete search history.

(56) References Cited

U.S. PATENT DOCUMENTS

| 4,443,877 A | 4/1984 | Chenausky et al. |
| 4,719,639 A | 1/1988 | Tulip |
| 4,817,108 A | 3/1989 | Allcock |
| 5,748,663 A * | 5/1998 | Chenausky .................. 372/64 |
| 6,285,703 B1 | 9/2001 | Schuelter |
| 6,704,333 B2 * | 3/2004 | Tulip ..................... 372/29.013 |
| 6,788,722 B1 * | 9/2004 | Kennedy et al. ............. 372/64 |
| 6,879,616 B2 | 4/2005 | Deile |

OTHER PUBLICATIONS

Lapucci et al., "On the Longitudinal Voltage Distribution in Radio-Frequency-Discharged $CO_2$ Lasers with Large-Area Electrodes" IEEE Journal of Quantum Electronics, vol. 31, No. 8, Aug. 1995, pp. 1537-1542.
Markillie et al., "Novel Design Approach Benefits $CO_2$ Laser Users", Laser Focus World, Oct. 2003, 2 pages.
Spindler, G., "Two-Dimensional Computational Model of Discharge Uniformity in Radio-Frequency-Excited $CO_2$ Slab Lasers with High Aspect Ratio Electrodes", IEEE Journal of Quantum Electronics, vol. 39, No. 2, Feb. 2003, pp. 343-349.
Strohschein et al., "Computational Model of Longitudinal Discharge Uniformity in RF-Excited $CO_2$ Slab Lasers", IEEE Journal of Quantum Electronics, vol. 32, No. 8, Aug. 1996, pp. 1289-1298.

* cited by examiner

*Primary Examiner*—Minsun Harvey
*Assistant Examiner*—Kinam Park
(74) *Attorney, Agent, or Firm*—Fish & Richardson P.C.

(57) ABSTRACT

An RF excited laser assembly includes a pair of opposed electrodes, and at least one inductor. The pair of opposed electrodes defines an inter-electrode gap that provides a discharge volume for laser propagation within a gas medium. The pair of opposed electrodes define one or more discharge-free regions within a laser-free region in the inter-electrode gap. The least one inductor is electrically connected to both electrodes and extends between the electrodes within the inter-electrode gap and inside of the one or more discharge-free regions within the laser-free region.

35 Claims, 17 Drawing Sheets

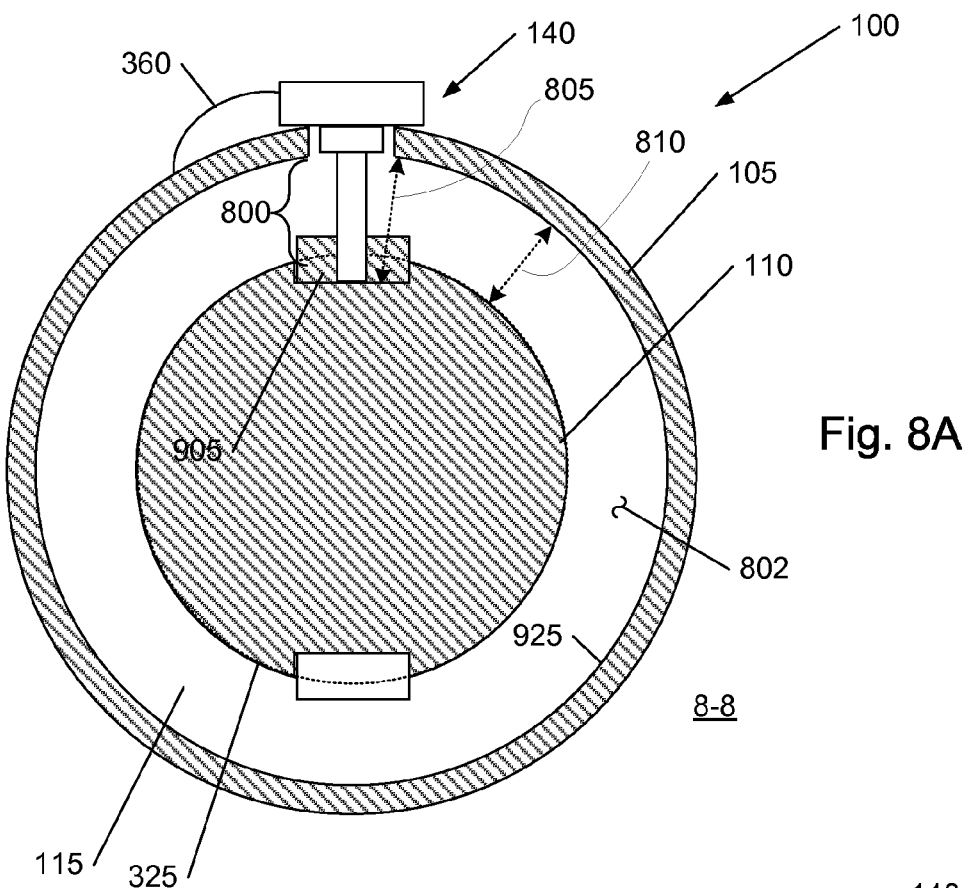
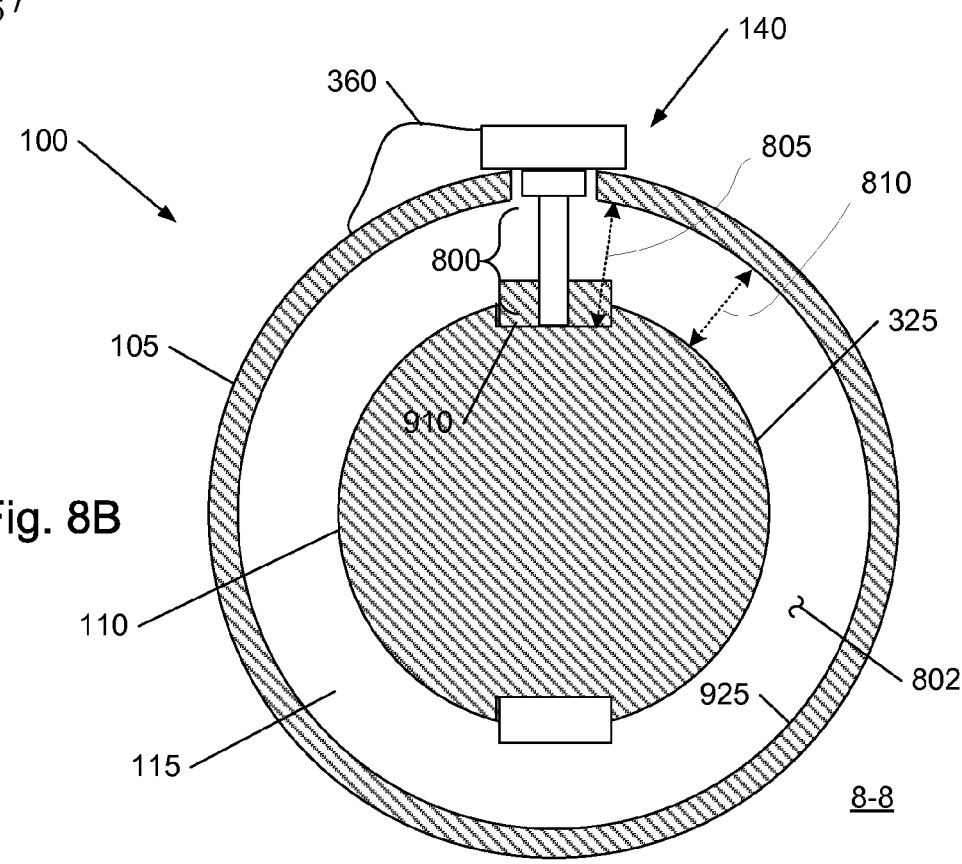

LASER HAVING DISTRIBUTED INDUCTANCES

CROSS REFERENCE TO RELATED APPLICATION

This application claims priority under 35 USC §119(e) to U.S. Application No. 60/985,174, filed on Nov. 2, 2007, which is incorporated herein by reference in its entirety.

TECHNICAL FIELD

The description relates to lasers, and more particularly to lasers having distributed inductances.

BACKGROUND

Machine integrators and original equipment manufacturers have been keen to extend the range and variety of applications that are driven by low- to moderate-power, sealed $CO_2$ gas lasers. High power gas lasers can be used in laser machining fields for marking, scribing, and drilling of metals or nonmetals, and for cutting and welding of materials such as, for example, metals.

The choice of design for any industrial laser is based upon the maximum power level, reliability, and costs for investment and operation. For a $CO_2$ laser, maximum power and efficiency are two important factors and are determined by the ability of the gas laser to extract unwanted excess heat from the laser gain medium. Heat extraction can be performed by either diffusion to cooled walls or by flowing of the heated laser gas out of the discharge area.

SUMMARY

In one general aspect, an RF excited laser assembly includes a pair of opposed electrodes, and at least one inductor. The pair of opposed electrodes defines an inter-electrode gap that provides a discharge volume for laser propagation within a gas medium. The pair of opposed electrodes define one or more discharge-free regions within a laser-free region in the inter-electrode gap. The least one inductor is electrically connected to both electrodes and at least a portion of the at least one inductor extends between the electrodes within the inter-electrode gap and inside of the one or more discharge-free regions within the laser-free region.

Implementations can include one or more of the following features. For example, the laser-free region can be a region in which the laser does not propagate. The discharge-free region can be a region within the inter-electrode gap in which the gas medium is not excited.

The electrodes can be annular and coaxial such that one electrode is an inner electrode and the other electrode is an outer electrode, and the inter-electrode gap is an annular gap defined between the inner and outer electrodes. The inner electrode can be hollow.

Adjacent surfaces of the electrodes at the discharge-free region can be separated by a distance that is large enough to prevent plasma discharge between the outer electrode and the inner electrode within the discharge-free region. The electrodes can be separated by a distance that is large enough to provide free space propagation of a laser beam within the discharge volume. The electrodes can be separated by a distance that provides waveguide propagation of a laser beam within the discharge volume.

The laser assembly can operate at a frequency of about 27 MHz, and the at least one inductor can define an inductor spacing of about 0.5 meters.

The laser assembly can include an RF excitation source electrically connected to both electrodes to generate a discharge within the discharge volume of the inter-electrode gap, and the at least one inductor defines an inductor spacing of less than about $1/10^{th}$ of the wavelength at which the RF excitation source operates.

The discharge volume can house carbon dioxide.

The gap between the electrodes can be greater within the discharge-free region than within the discharge volume such that a discharge is prevented from occurring in the discharge-free region.

The laser assembly can include an excitation source electrically connected to both electrodes to generate a discharge within the discharge volume of the inter-electrode gap.

The laser assembly can include resonator mirrors mounted at ends of the inter-electrode gap to define a resonator for guiding laser light within the discharge volume. The resonator can be an unstable resonator.

Each of the electrodes of the pair of electrodes can be planar.

In another general aspect, an RF excited laser assembly includes a cylindrical inner electrode, a cylindrical outer electrode that is coaxial with the cylindrical inner electrode to define an annular inter-electrode gap between the inner and outer electrodes that defines a discharge volume, and at least one inductor. The at least one inductor is electrically connected to both the inner electrode and the outer electrode and extends between the inner electrode and the outer electrode such that the at least a portion of the at least one inductor extends through the inter-electrode gap.

Implementations can include one or more of the following features. For example, the inner electrode can be hollow. The at least one inductor can extend between the inner electrode and the outer electrode inside of a discharge-free region of the inter-electrode gap.

The inter-electrode gap can be greater within the discharge-free region than within the discharge volume such that a discharge is prevented from occurring in the discharge-free region.

The electrodes can be separated by a distance that is large enough to provide free space propagation of a laser within the discharge volume. The electrodes can be separated by a distance that provides waveguide propagation of a laser within the discharge volume.

The laser assembly can operate at a frequency of about 27 MHz, and the at least one inductor can define an inductor spacing of about 0.5 meters.

The laser assembly can operate at a wavelength determined by an RF excitation source. The RF excitation source can be electrically connected to both electrodes to generate a discharge within the discharge volume of the inter-electrode gap. The at least one inductor can define an inductor spacing of less than about $1/10^{th}$ of the wavelength at which the RF excitation source operates.

The discharge volume can house carbon dioxide.

The laser assembly can include an excitation source electrically connected to both electrodes to generate a laser discharge within the discharge volume of the inter-electrode gap.

The laser assembly can include resonator mirrors mounted at ends of the inter-electrode gap to define a resonator for guiding laser light within the discharge volume. The resonator can be an unstable resonator.

The at least one inductor can be non-insulated or at least that portion of the at least one inductor within the inter-electrode gap can be non-insulated.

In another general aspect, a method of generating a laser discharge includes providing a pair of electrodes defining an inter-electrode gap that provides a discharge volume for laser propagation within a gas medium. The pair of opposed electrodes define one or more discharge-free regions within a laser-free region in the inter-electrode gap. Additionally, at least one inductor electrically connected to both electrodes and extending between the electrodes within the inter-electrode gap and inside of the one or more discharge-free regions within the laser-free region is provided. A laser discharge is generated within the discharge volume such that the at least one inductor does not contact the discharge.

In a further general aspect, a method of generating a laser discharge includes providing a pair of cylindrical coaxial electrodes defining an annular inter-electrode gap that provides a discharge volume for laser propagation within a gas medium, providing at least one inductor electrically connected to both electrodes and extending between the electrodes within the inter-electrode gap, and generating a laser discharge within the discharge volume.

Implementations can include one or more of the following features. For example, the at least one inductor can be non-insulated.

In another general aspect, an RF excited laser assembly includes a pair of opposed electrodes defining an inter-electrode gap that provides a discharge volume for laser propagation within a gas medium, and electrode feedthroughs. The pair of opposed electrodes define one or more discharge-free regions within a laser-free region in the inter-electrode gap. The electrode feedthroughs each extend from one electrode to the other electrode and through the inter-electrode gap. Each electrode feedthrough is configured to be adapted to operate in a first mode in which an inductor electrically connects through the electrode feedthrough to both electrodes to extend between the electrodes within the inter-electrode gap and is configured to be adapted to operated in a second mode in which an RF power source electrically connects through the electrode feedthrough to both electrodes.

Implementations can include one or more of the following features. For example, a first electrode feedthrough can operate in the first mode and a second electrode feedthrough can operate in the second mode.

In another general aspect, an RF excited laser includes a pair of opposed electrodes that define an inter-electrode gap that provides a discharge volume for laser propagation within a gas medium, an excitation source electrically connected to both electrodes to generate a laser discharge within the discharge volume of the inter-electrode gap, resonator mirrors mounted at ends of the inter-electrode gap to define a resonator for guiding laser light within the discharge volume, and at least one inductor electrically connected to both electrodes. The pair of opposed electrodes define one or more discharge-free regions within a laser-free region in the inter-electrode gap, and the at least one inductor extends between the electrodes within the inter-electrode gap and inside of the one or more discharge-free regions within the laser-free region.

The discharge-free region is a region within the inter-electrode gap in which the gas medium is not excited. The laser-free region is a region in which the laser beam does not propagate. The laser propagates within the discharge volume defined by the inter-electrode gap.

The RF excited laser is designed with one or more inductors distributed along the length of the electrodes, with the number of inductors being dependent upon the wavelength of the RF signal output from the RF source. The inductors effectively shorten the effective length of the transmission line and reduce the longitudinal variation in the electric field along the electrodes. Therefore, the RF excited laser operates with a more evenly distributed voltage distribution along the length of the electrodes to enable an increase in the length or size of the electrodes and to increase output power.

Because the inductors and the inductor arrangements extend through the inter-electrode gap, the inductors can also provide mechanical reinforcement between the electrodes and along the length of the electrodes to reduce sagging or warping within the inter-electrode gap.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

FIGS. 8A and 8B are cross sectional axial views of two different implementations taken along section 8-8 of FIG. 1B;

DETAILED DESCRIPTION

Figure 1A:
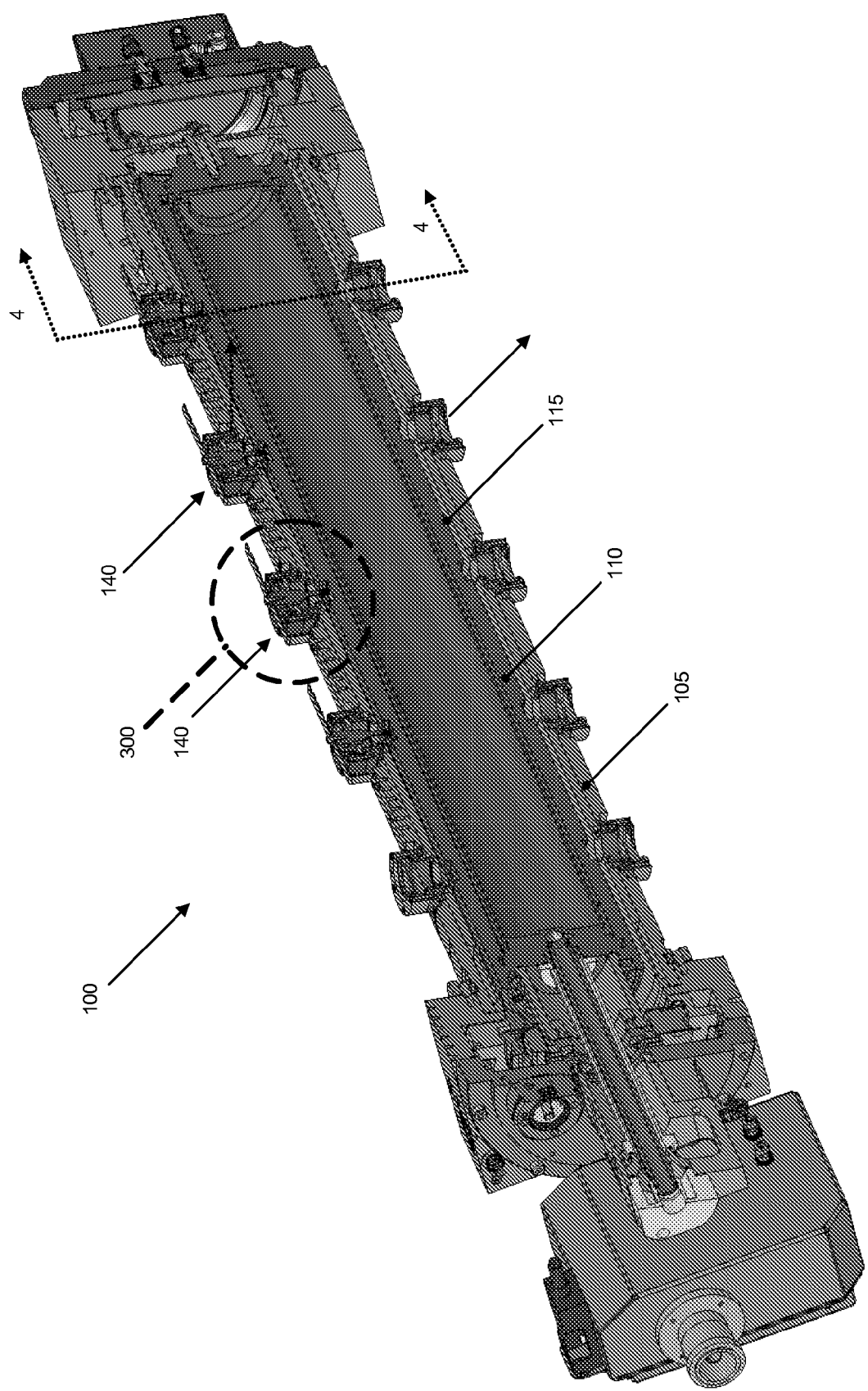
FIG. 1A is a cross sectional perspective view of an RF excited laser taken along a longitudinal direction.
Figure 1B:
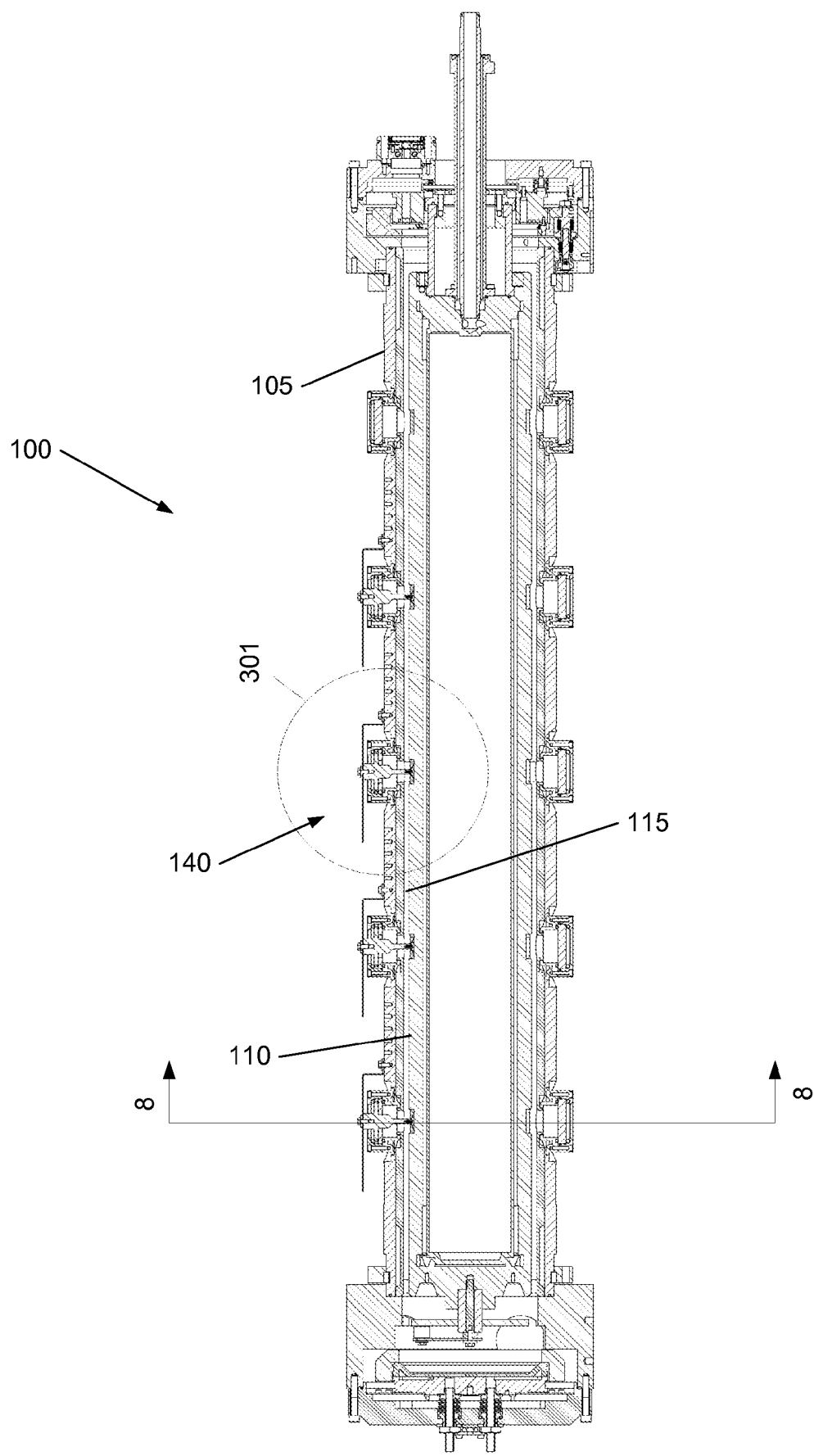
FIG. 1B is a cross sectional view of the RF excited laser of FIG. 1A taken along the longitudinal direction.
Figure 2:
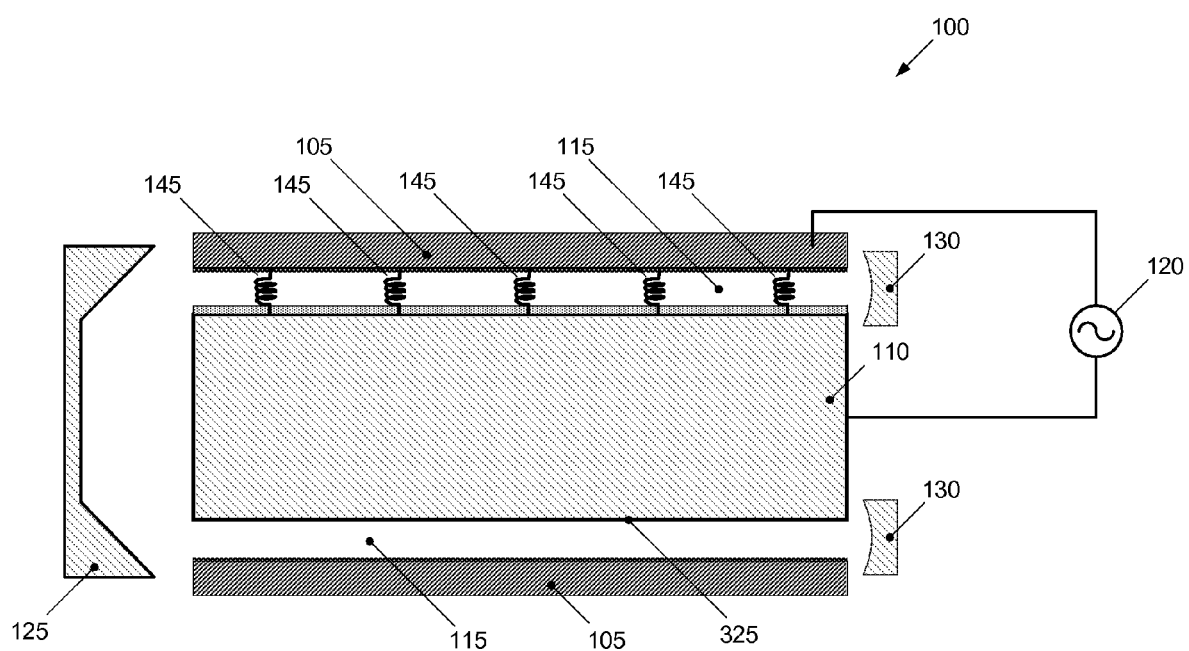
FIG. 2 is a schematic representation of the RF excited laser of FIG. 1A.
Figure 3A:
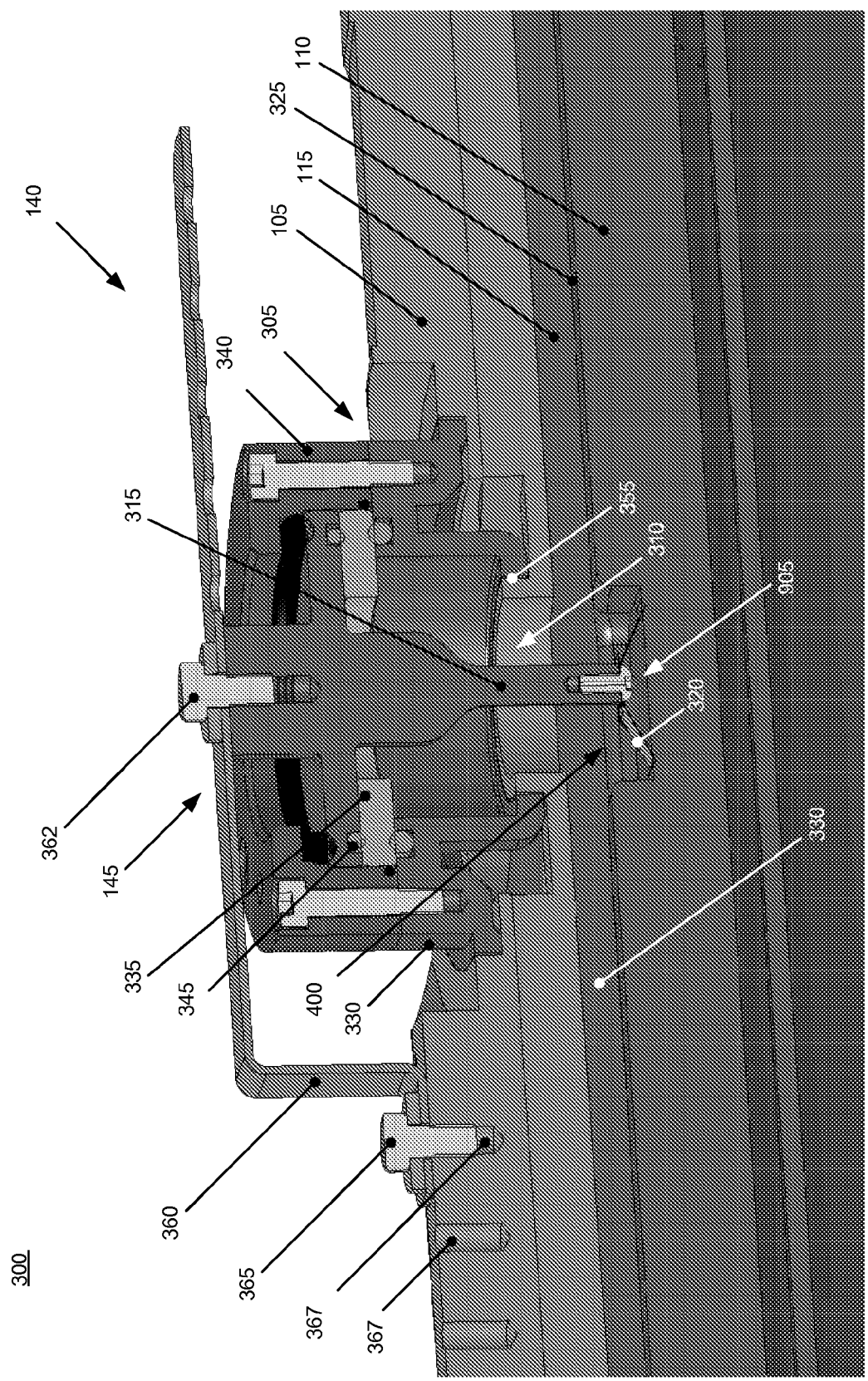
FIG. 3A is a cross sectional expanded view taken from section 300 of FIG. 1A.
Figure 3B:
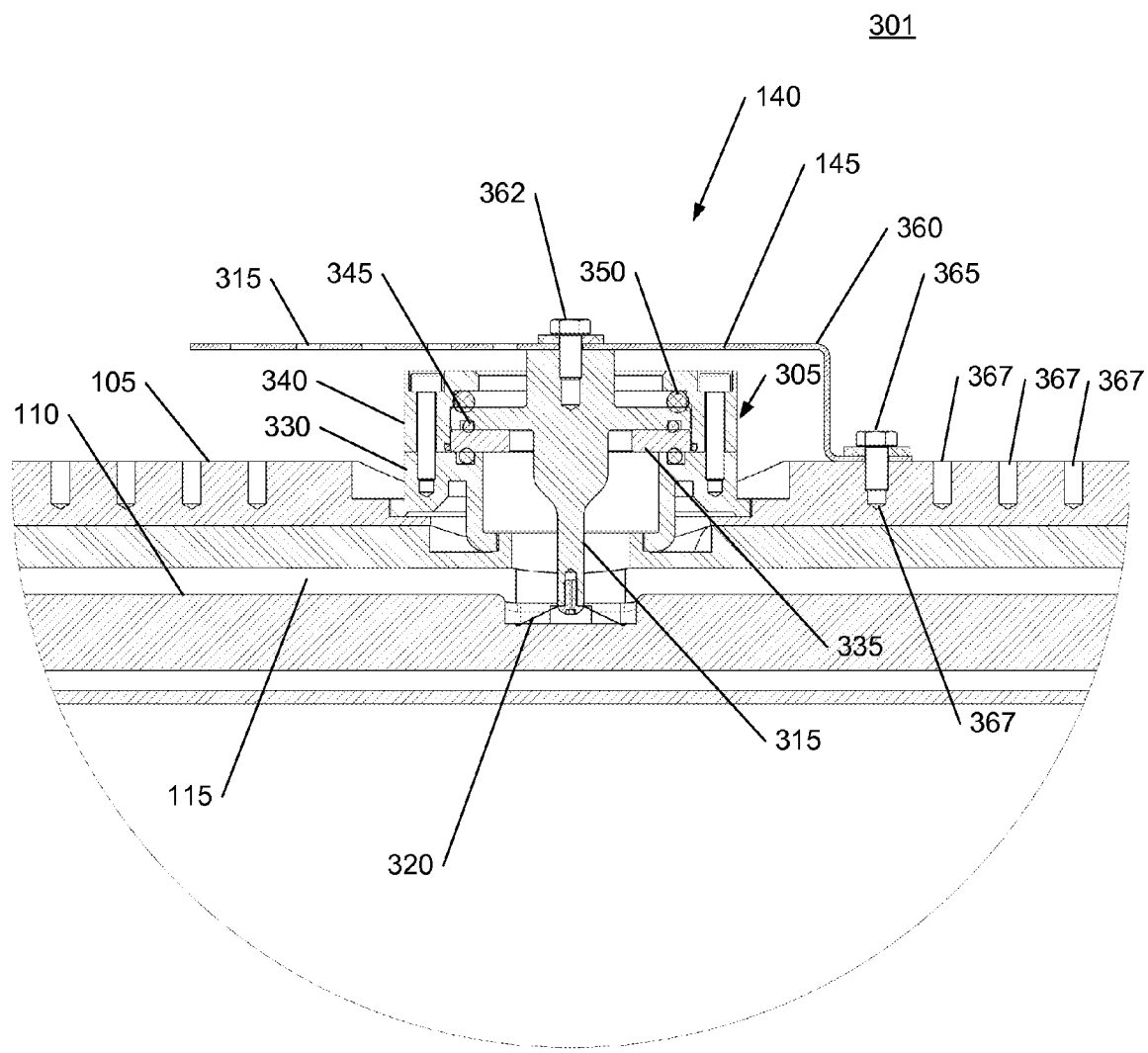
FIG. 3B is a cross sectional expanded view taken from section 301 of FIG. 1B.

Referring to FIGS. 1A, 1B, and 2, a radio frequency (RF) excited laser 100 includes a pair of opposed electrodes 105, 110 defining an inter-electrode gap 115 that provides a discharge volume for excitation of a gas medium to electrically pump a laser. As shown in FIGS. 1-2, the laser 100 has an annular geometry. In an annular geometry, the electrode 105 is an outer cylindrical electrode 105 and the electrode 110 is an inner cylindrical electrode 110 that coaxially extends along an inner opening of the outer electrode 105 to define the annular inter-electrode gap 115.

The laser 100 can be diffusion cooled by cooling one or more of the electrodes 105, 110 (for example, the outer electrode 105) using a water cooling system. The laser 100 can operate using a radio frequency (RF) excitation source 120 that provides power to the inner electrode 110 and to the outer electrodes 105. The optical resonator of the laser 100 is formed by a front mirror 125 and a rear mirror 130 and the two electrodes 105, 110. Thus, excitation of the laser gas takes place in the discharge volume (or RF field) between the electrodes. The resonator design produces a linearly polarized beam.

In one specific implementation, the laser 100 is a carbon dioxide ($CO_2$) gas laser, which is a laser based on a gain medium that contains carbon dioxide ($CO_2$), helium (He), nitrogen ($N_2$), and possibly some hydrogen ($H_2$), water vapor, and/or xenon (Xe). The $CO_2$ gas laser 100 operating using an RF source 120 can emit at a wavelength from between about 9 to 11 μm and in particular, at about 10.59 μm. The electrodes 105, 110 extend along a longitudinal axis 135, can have longitudinal lengths of about 1.3 m and diameters on the order of a couple hundred millimeters, and can define an inter-electrode gap 115 of about 6 mm at a pressure of, for example, about 70-90 millibars. The size of the gap 115 is related to the source frequency and the pressure within the gap 115; therefore, if a particular gap 115 size is needed, then the source frequency and pressure within the gap 115 can be adjusted accordingly. For example, if the gap size is decreased then the frequency and the gap pressure are increased.

The laser 100 includes one or more inductor arrangements 140 including inductors 145 that are electrically connected by a connecting system (described and shown below) across electrodes 105, 110. As described below, the connecting system and the inductors 145 extend from the inter-electrode gap 115, which is sealed from atmosphere and is under a vacuum, to outside of the outer electrode 105 (at atmosphere). The inductors 145 are any devices that produce inductive losses but that have low capacitive and resistive losses.

Referring also to FIGS. 3A-7, the inductor 145 includes a conductive rod or feedthrough 315 that contacts an outer surface of the inner electrode 110 within the vacuum and extends through a vacuum-sealed opening 310 of the outer electrode 105. The inductor 145 also includes a lead 360 that is detachably connected to the feedthrough 315 using, for example, a screw 362. The inductor 145 is electrically connected to the outer electrode 105 by the lead 360 that makes suitable electric contact with the outer surface of the outer electrode 105. For example, the lead 360 can be attached to the outer surface of the outer electrode 105 using a screw 365 that is screwed into an opening 367 formed in the outer surface of the outer electrode 105. By removing screws 362 and 365, the position of the lead 360 relative to the outer surface of the outer electrode 105 can be adjusted and therefore the current length from the feedthrough 315 to the outer electrode 105 can be adjusted to adjust the value of the inductance that is produced by the inductor 145. Therefore, the inductance of the inductor 145 can be easily adjusted without having to open the vacuum seal or remove the feedthrough 315.

The conductive rod 315 terminates at one end at a flexible conductive contact 320 that contacts an outer surface 325 of the inner electrode 110. The central conductive rod 315 can be made of a material suitable for operation within a vacuum and able to withstand high current and high temperatures within the gap 115. Moreover, the conductive rod 315 is non magnetic, for example, the rod 315 can be made of copper, aluminum, or brass. Similarly, the conductive contact 320 can be a copper-beryllium spring finger. The conductive rod 315 is non-insulated within the gap 115; that is, it is not covered with an external insulator cover.

The connecting system 305 connects the inductor 145 to both electrodes 105, 110 and provides a modular system to enable three different modes of operation at the opening 310. In one mode, the feedthrough 315 is inserted through the opening 310 and the connecting system 305 and the lead 360 are attached to provide the inductor arrangement 140. In another mode, the lead 360 is detached from the connecting system 305 at the screw 362 and the connecting system 305 provides a means for using the feedthrough 315 as a power source location. In a further mode, the lead 360 and the feedthrough 315 are removed and a cap (with a window) is attached at the connecting system 305.

The opening 310 is vacuum sealed by a sealing system between the connecting system 305 and the outer electrode 105. The connecting system 305 includes a sealing adapter 330 that is attached to the outer surface of the outer electrode 105 by, for example, brazing or welding. The sealing adapter 330 remains attached to the outer surface of the outer electrode 105 during all three modes of operation and therefore acts as an adapter for the various devices that can connect to it in the different modes. The sealing adapter 330 is made of any material that can be welded or brazed to the outer electrode 105, for example, metals such as aluminum. The connecting system 305 also includes a cover 340 that is vacuum sealed to the sealing adapter 330 with an intermediate gasket 335 and O-ring seals provided by O-rings 345, 350. The cover 340 can be made of any non-conductive or dielectric material such as plastic or ceramic. The gasket 335 can be made of any non-conductive material that can operate within a vacuum such as, for example, ceramic.

The gasket 335 and the cover 340 can both be removed when operating in the mode in which the feedthrough 315 and the lead 360 are removed and a cap is placed on the sealing adapter 330. Moreover, the gasket and the cover 340 remain attached when operating in the mode in which the lead 360 is removed but the feedthrough 315 provides a feedthrough for a power source.

Referring in particular to FIGS. 8A and 8B, the conductive rod 315 can extend inside a discharge-free region 800 of the inter-electrode gap 115, where the discharge-free region 800 is within a laser-free region of the inter-electrode gap 115. The discharge-free region 800 is a region within the inter-electrode gap 115 in which the gas medium is not excited.

The laser-free region of the inter-electrode gap 115 can be formed, for example, by two stabilizers (such as stabilizers 5 that are shown and used in U.S. Pat. No. 6,285,703, which is incorporated herein by reference in its entirety). The stabilizers are located azimuthally opposite one another between the inner and outer electrodes. The stabilizers consist of an insulating material, for example, a ceramic material, and they can be used to hold the inner electrode 110 relative to the outer electrode 105 at the side of one of the mirrors. One the stabilizers can be located in the direct vicinity of the exit window.

Moreover, because the discharge-free region 800 is within the laser-free region, the laser does not propagate within the discharge-free region 800 and the laser is not disrupted by the presence of the discharge-free region 800 (because the laser is not propagating within the discharge-free region 800).

The conductive rod 315 is placed within the discharge-free region 800 to prevent the conductive rod 315 from heating and to prevent arcing within the resonator. Moreover, the discharge-free region 800 is provided within the laser-free region to enable the conductive rod 315 to extend through the resonator without interfering with laser propagation.

Figure 10:
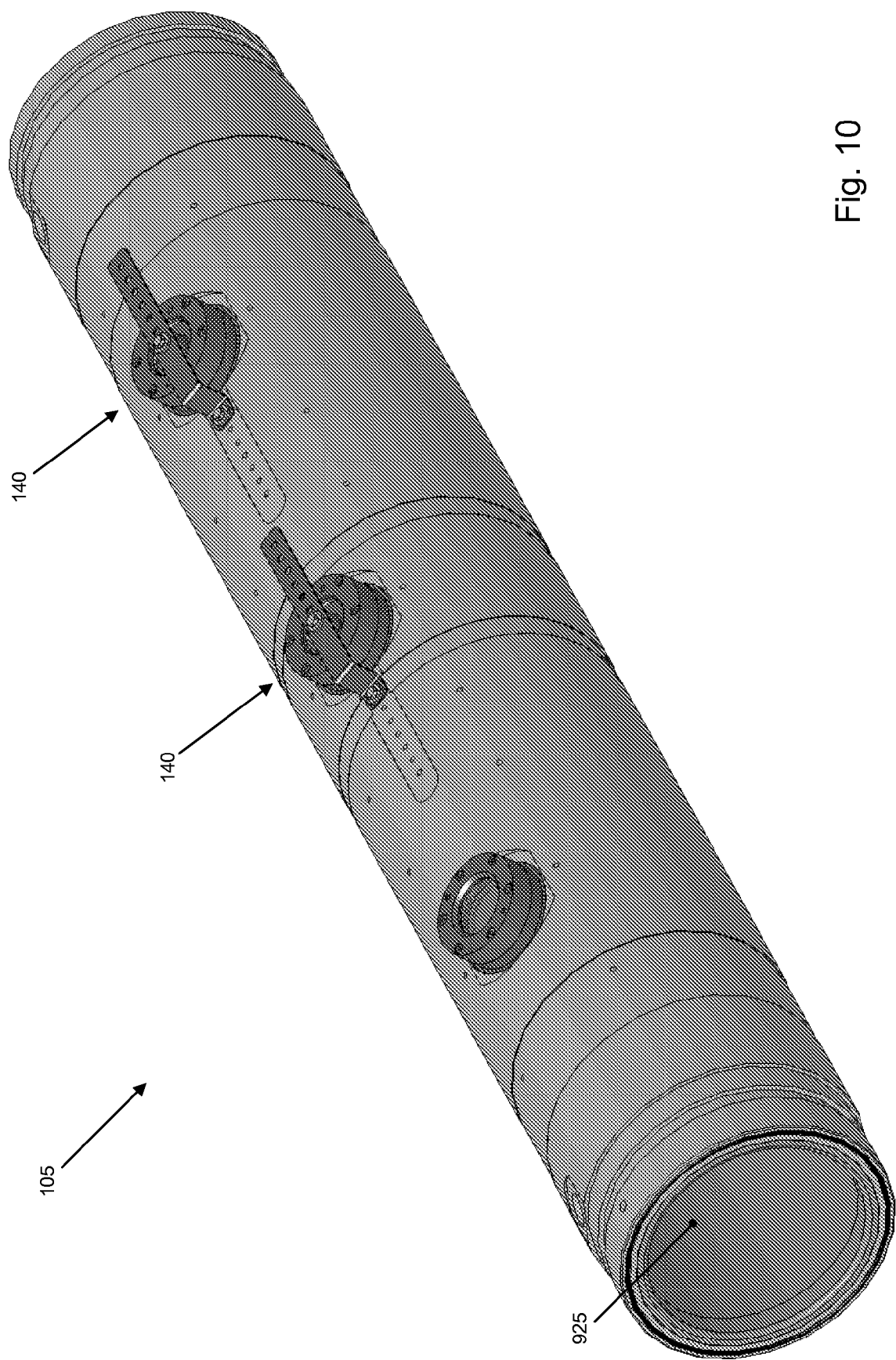
FIG. 10 is a perspective view of an outer electrode that can be used in the laser of FIGS. 1A and 1B.

The discharge-free region 800 is formed by varying the size of the inter-electrode gap 115. In one implementation which is shown in FIGS. 8A and 8B and 10, the distance 805 between the inner surface 925 of the outer electrode 105 and the outer surface 325 of the inner electrode 110 (that is, adjacent surfaces of the electrodes 105, 110) in and/or near the discharge-free region 800 is large enough to prevent or inhibit plasma discharge between the outer electrode 105 and the inner electrode 110 within the discharge-free region 800 (thus, the plasma cannot ignite within the discharge-free region 800). On the other hand, the distance 810 between adjacent surfaces of the electrodes 105, 110 outside of the discharge-free region 800 is small enough to promote plasma discharge between the outer electrode 105 and the inner electrode 110 within the discharge volume 802 (the volume outside of the discharge-free region 800) of the laser 100. In other words, the gap 115 between the electrodes 105, 110 within the discharge-free region 800 is greater than the gap 115 between the electrodes 105, 110 within the discharge volume (which is outside of the discharge-free region 800) such that a discharge is prevented from occurring in the discharge-free region 800. The removal of the discharge from the discharge-free region 800 is not necessary for the operation of the laser 100; rather, it is provided in the design of the laser 100 to improve performance of the inductors 145 by avoiding overheating and arcing that could otherwise be caused by interaction of the inductors 145 with the discharge.

Moreover, the distance 810 between adjacent surfaces of the electrodes 105, 110 can be large enough to provide free space propagation of a laser within the discharge volume (such that the electrodes 105, 110 do not act as a waveguide). By making the gap 115 wide enough to enable free space propagation, the discharge can be excited at 27 MHz, a frequency that does not require any special management of the lossy transmission line or additional RF feeds up to the approximately 1 meter length of the electrodes 105, 110. In any case, laser propagation is promoted within the discharge volume but not within the discharge-free region 800.

The mirrors 125, 130 are mounted at ends of the inter-electrode gap 115 to define a resonator for guiding the laser light within the discharge volume. The mirrors 125, 130 can be fabricated and machined in a manner that can be considered as the annular equivalent of the planar nonconfocal hybrid stable-unstable resonator. The detailed design of the mirrors 125, 130, and the electrodes 105, 110 can be found, for example, in U.S. Pat. No. 6,285,703. For example, a first mirror can have a generally toroidal concave reflecting surface and a second mirror can have a generally conical reflecting surface for deflecting laser radiation into azimuthally opposite regions of the reflecting surface of the first mirror, and one of the mirrors can have a beam exit window in an azimuthal area of its reflecting surface, one of the reflecting surfaces of the mirrors can include azimuthal deflection effecting means for effecting azimuthal inclination to incrementally displace the laser radiation as it is reflected back and forth between the mirrors 125, 130 until it reaches an exit window.

Figure 9A:
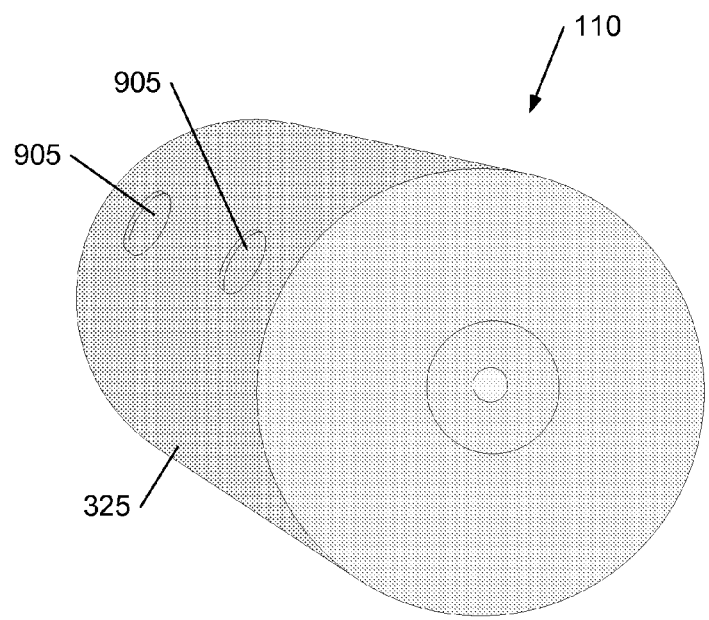
FIGS. 9A and 9B are axial perspective views of two different implementations of inner electrodes that can be used in the laser of FIGS. 1A and 1B.
Figure 9B:
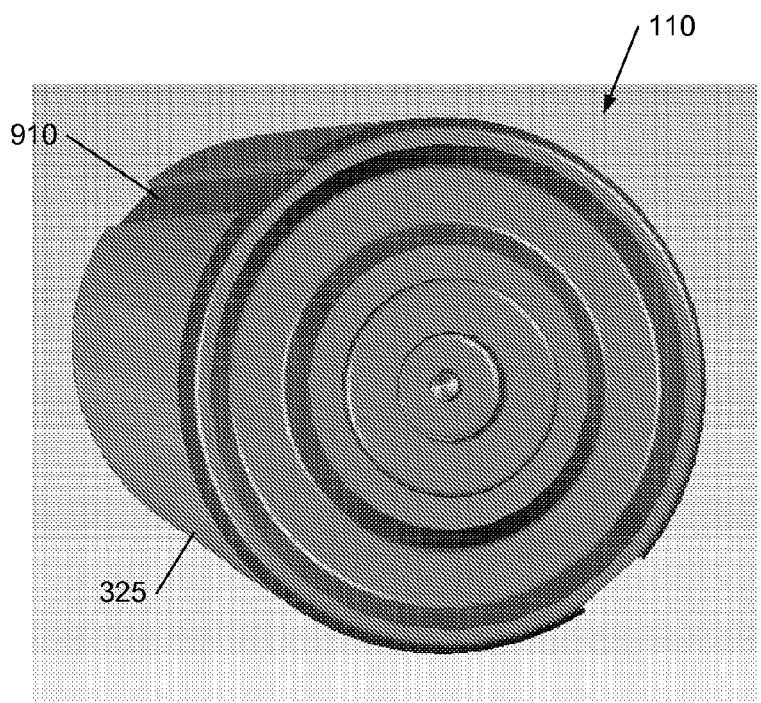

Referring also to FIGS. 9A and 9B, the outer surface 325 of the inner electrode 110 can be formed with localized depressions 905 (as shown in FIGS. 8A and 9A) or the outer surface 325 of the inner electrode 110 can be formed with grooves or slots 910 (as shown in FIGS. 8B and 9B). The depressions 905 and the slots 910 can be formed into the outer surface 325 of the inner electrode 110 to increase the distance 805 between the inner surface 925 of the outer electrode 105 and the outer surface 325 of the inner electrode 110 (that is, adjacent surfaces of the electrodes 105, 110) in and/or near the discharge-free region 800 to prevent or inhibit plasma discharge between the outer electrode 105 and the inner electrode 110 within the discharge-free region 800. The depressions 905 and the slots 910 can be of any suitable shape and size. For example, the depressions 905 can be polygonal (for example, square or rectangular), or circular or oval. The depressions 905 and the slots 910 can generally have a width of about 10-20 mm (or scale with the size of the gap 115) and can be spaced circumferentially apart by 180°, for example. The size of the depressions 905 and the slots 910 determines the size of the discharge-free region 800; thus, it is beneficial if the size of the depressions 905 and the slots 910 is larger than the size of the laser-free regions.

The laser 100 includes enough inductor arrangements 140 along the length of the electrodes 105, 110 to reduce or minimize longitudinal variations in the voltage distribution along the length of the electrodes 105, 110 because variations in the voltage distribution can cause variations in the temperature of the gas within the gap 115, the electron energy, discharge brightness, and gain of the laser 100. Moreover, a reduction in the voltage distribution variation enables operations of the laser 100 at a higher electro-optical efficiency and provides power scaling for larger electrodes. For an RF excited laser operating at a frequency of about 27 MHz, the laser 100 can include about one inductor 145 every 0.5 meters. As another example, for an RF excited laser operating at a frequency of about 80-100 MHz, the laser can include about one inductor 145 every 5-10 centimeters along the longitudinal length. In general, therefore, the spacing between the inductors can be less than about $1/10^{th}$ of the wavelength at which the RF excitation source operates.

Figure 11:
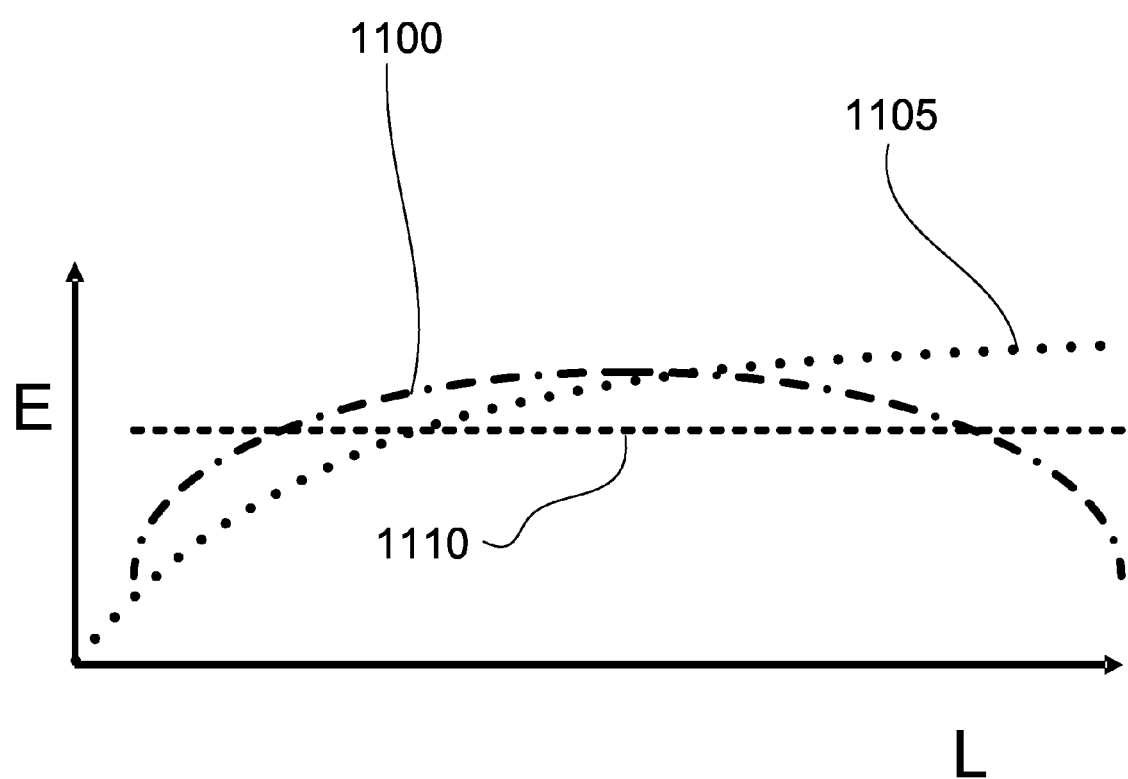
FIG. 11 is a graph of electric field distribution versus length along the electrodes of the laser of FIGS. 1A and 1B and of other lasers.
Figure 12A:
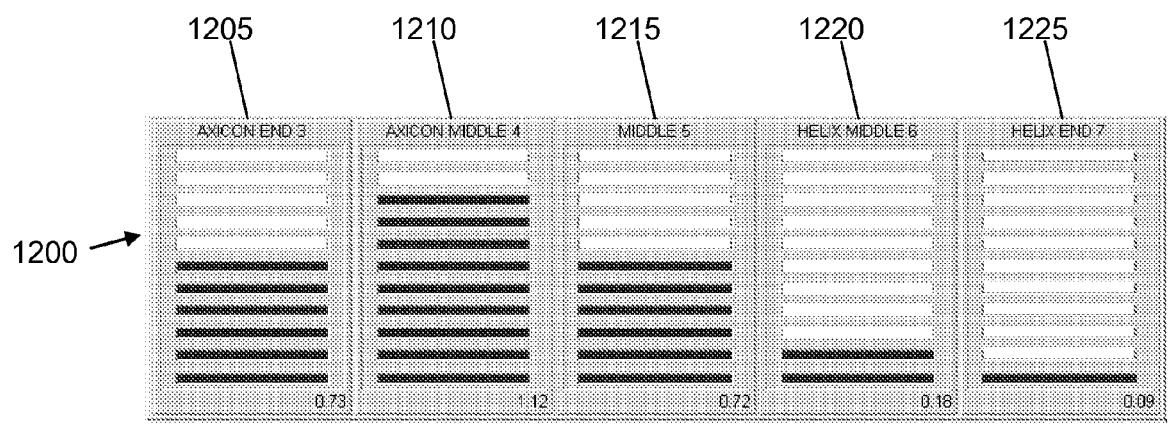
FIGS. 12A and 12B are graphs showing the relationship of brightness along the electrodes of a laser.
Figure 12B:
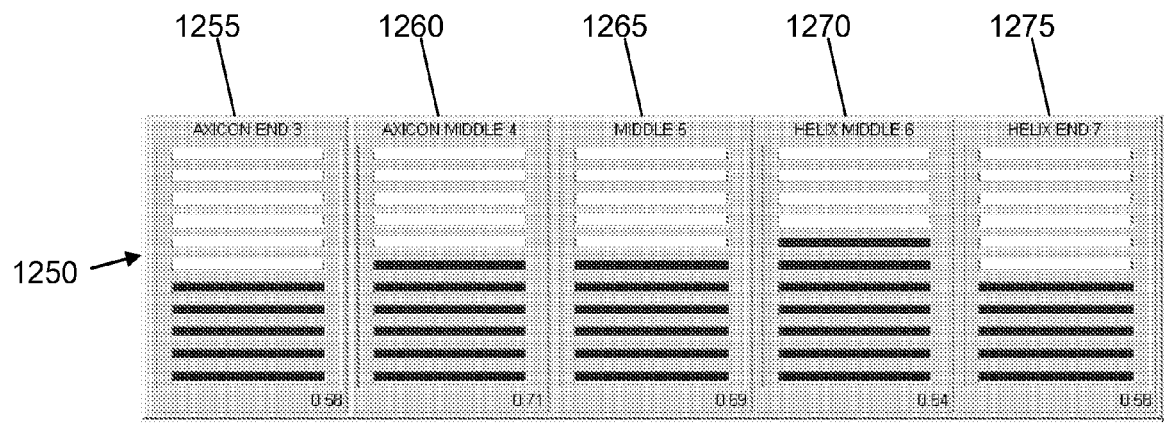

For example, referring to FIG. 11, the electric field distribution E is shown over the longitudinal length L of the laser 100 for an RF excited laser lacking the inductor arrangements 140 and having a terminated end feed (line 1100), for an RF excited laser lacking the inductor arrangements 140 and having no terminated end feed (line 1105), and for the RF excited laser 100 having the inductor arrangements 140 (line 1110). The electric field distribution of the laser 100 does not display the significant change at the ends of the laser relative to the middle. This phenomenon is also demonstrated in FIGS. 12A and 12B, where FIG. 12A shows the brightness distribution 1200 of the discharge at various lengths 1205, 1210, 1215, 1220, 1225 along the discharge volume for an RF excited laser lacking the inductor arrangements 140 and FIG. 12B shows the brightness distribution 1250 of the discharge at various lengths 1255, 1260, 1265, 1270, 1275 of the discharge volume for the RF excited laser 100 having the inductor arrangements 140.

Figure 4:
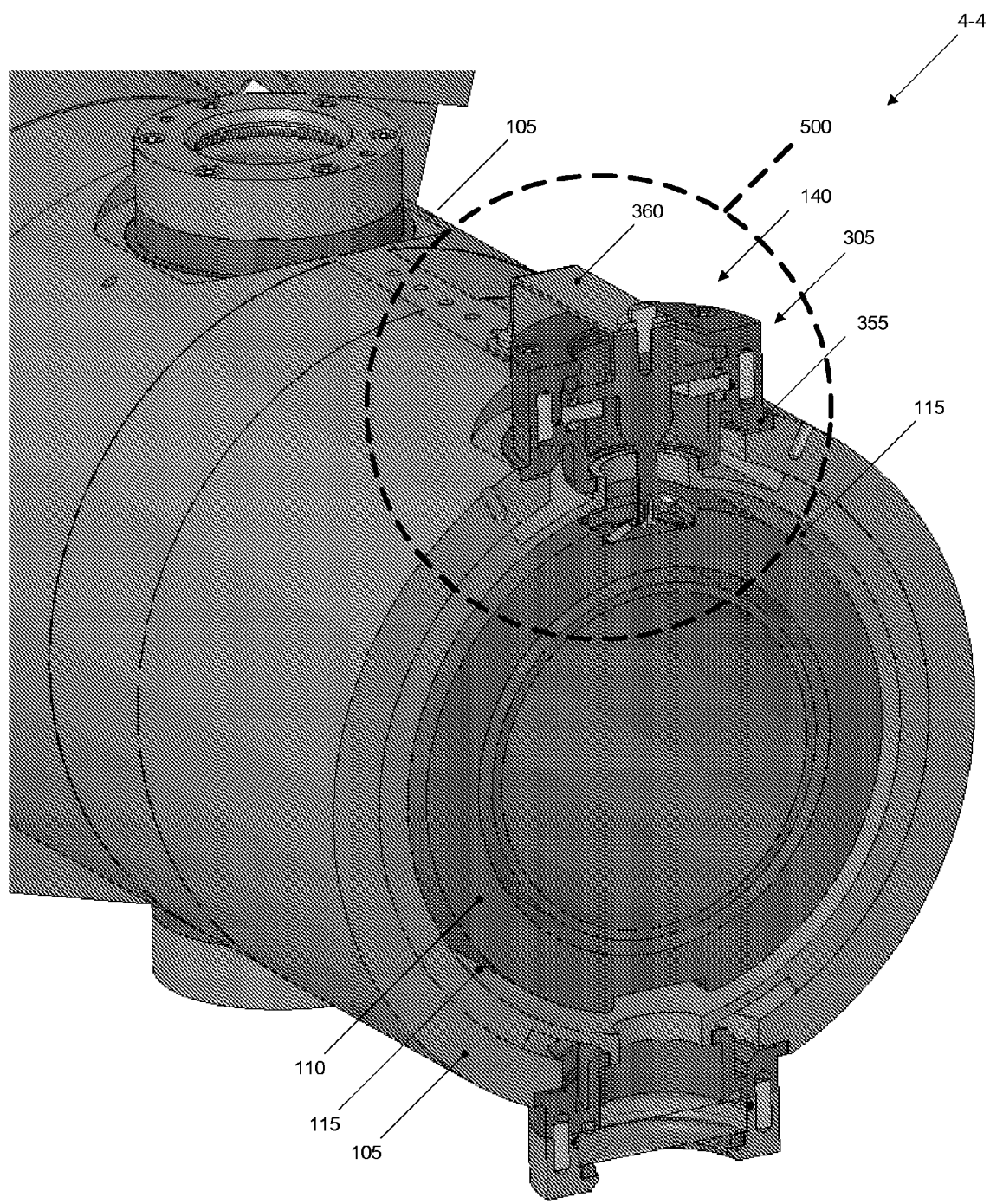
FIG. 4 is a cross sectional axial view taken along 4-4 of FIG. 1A.
Figure 5:
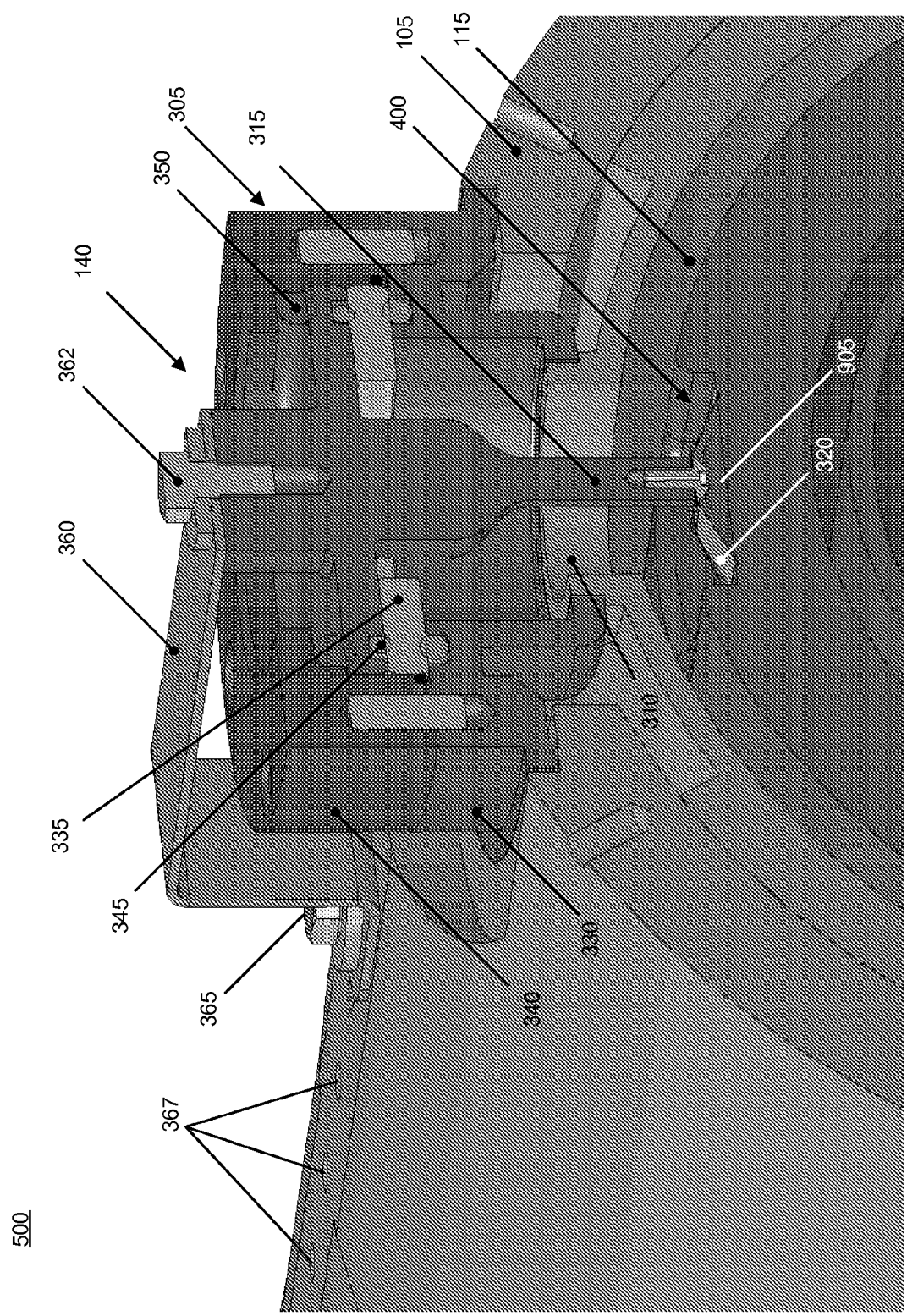
FIG. 5 is a cross sectional axial view taken from section 500 of FIG. 4.
Figure 6:
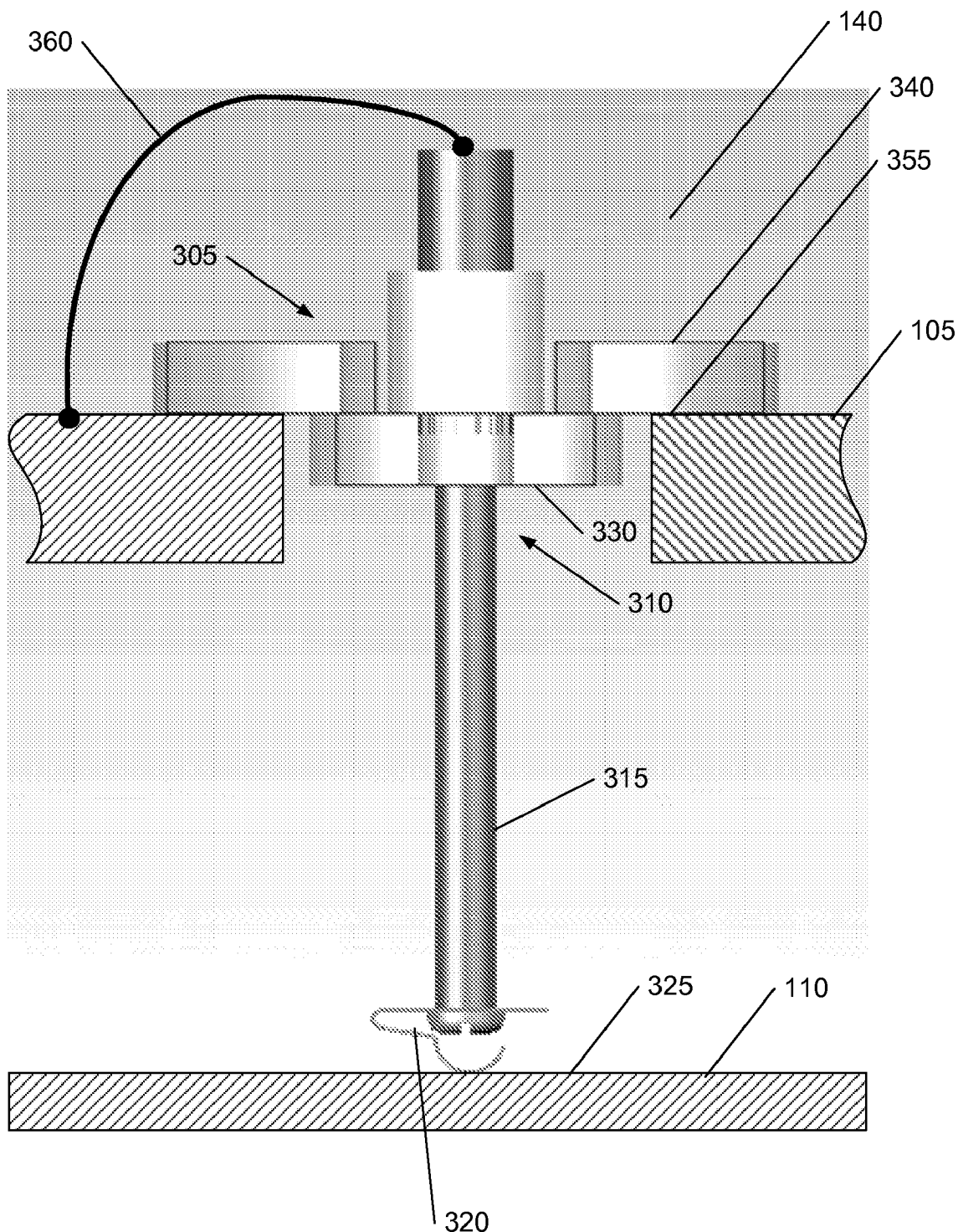
FIG. 6 is a schematic representation of a section of a side cross-sectional view of one implementation of the RF excited laser of FIG. 1A.
Figure 7:
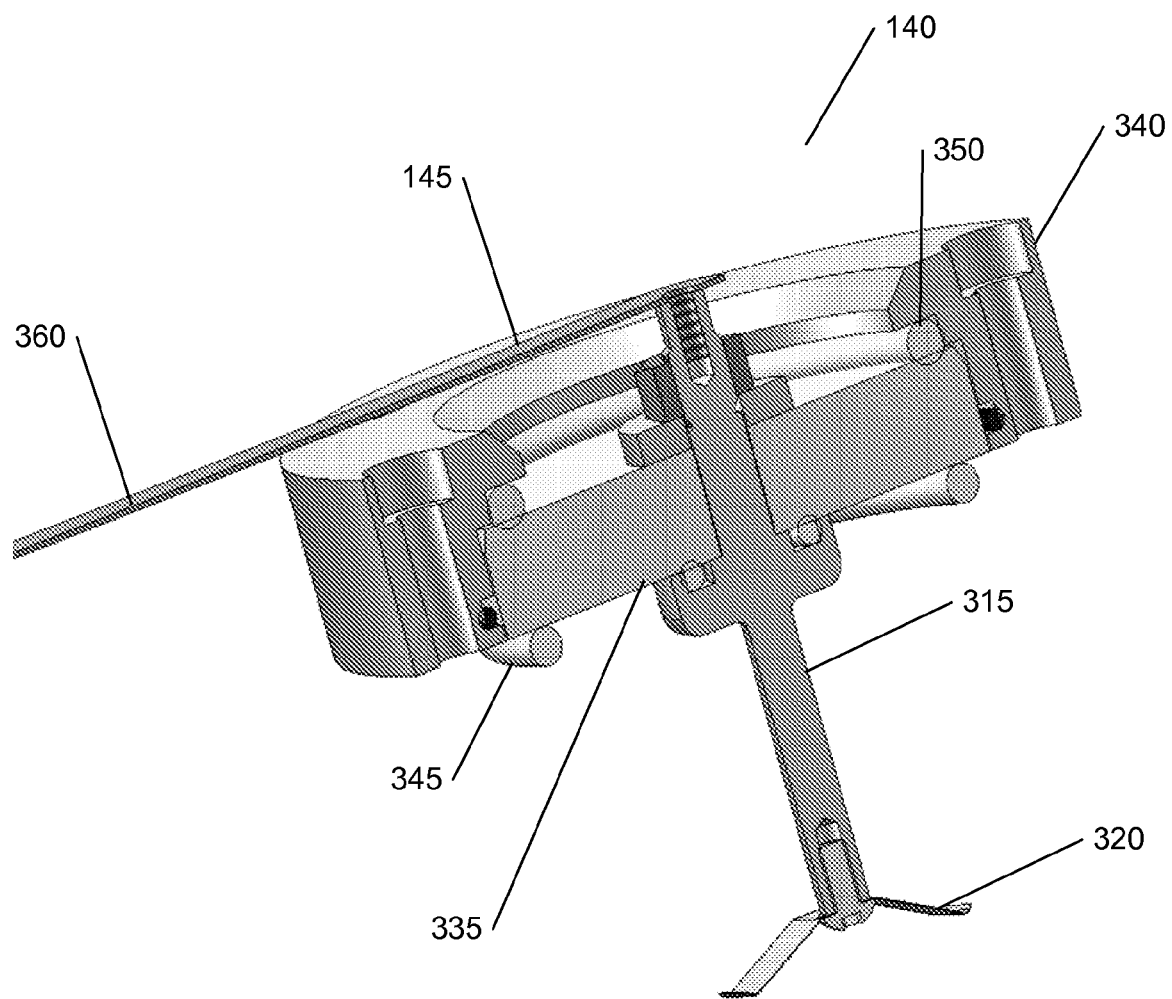
FIG. 7 is a cross sectional perspective view of an inductor arrangement that can be used in the laser of FIG. 1A.

The inner electrode 110 can have a hollow cylindrical shape such as shown in FIGS. 4 and 5. Alternatively, the inner electrode 110 can have a solid cylindrical shape, as shown in FIGS. 8A and 8B or a generally solid cylindrical shape, as shown in FIGS. 9A and 9B (where other features such as grooves may be formed along the side flat surfaces). Additionally to the design of FIGS. 4 and 5, the inner electrode 110, while having a hollow center, can still have features such as openings between the outer surface and the hollow center.

Figure 13:
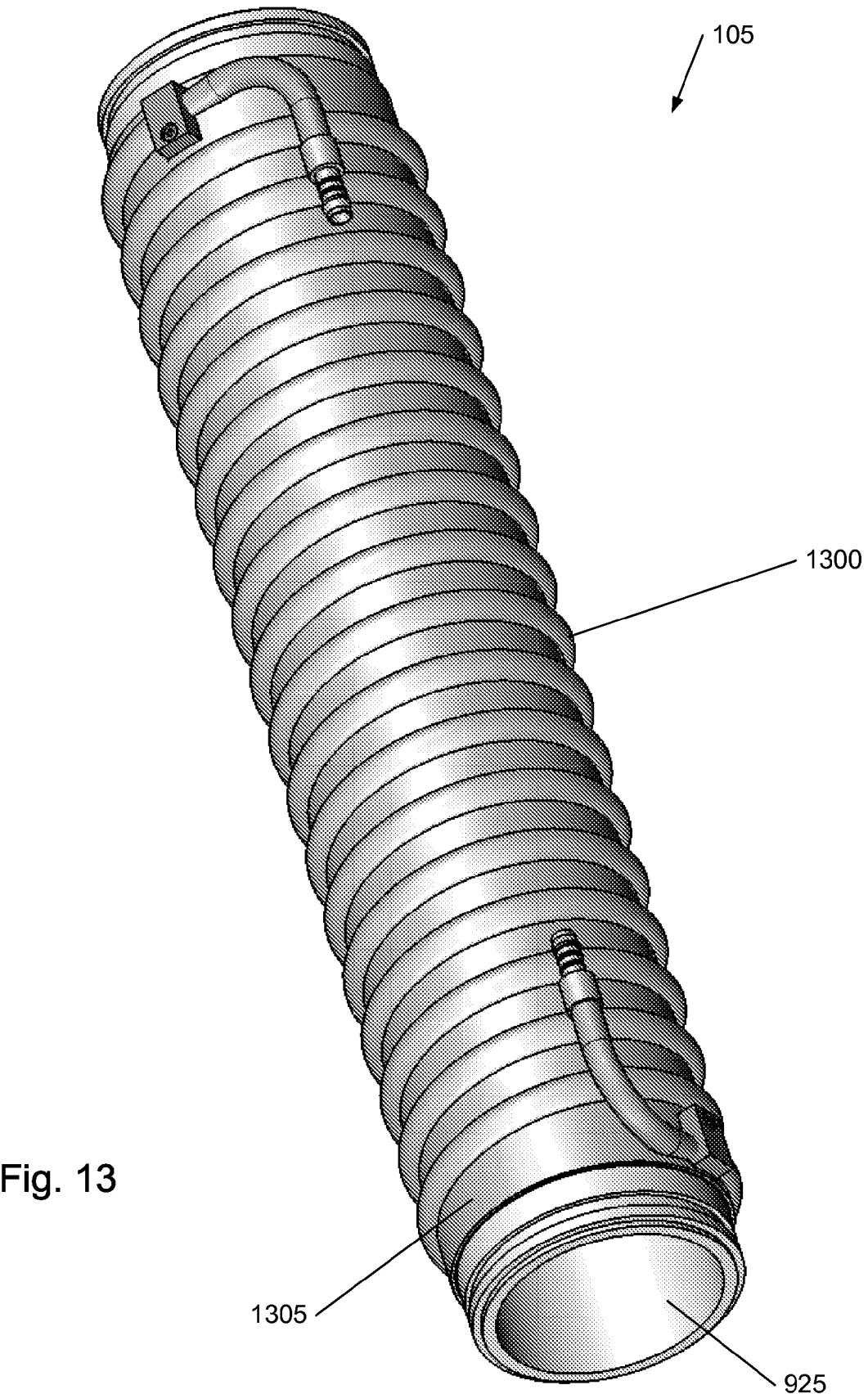
FIG. 13 is a perspective view of another implementation of an outer electrode that can be used in the laser of FIGS. 1A and 1B.

As shown in FIG. 10, the outer electrode 105 is designed with two concentric cylinders that are welded together to form an annular gap in which tubes of cooling water are wrapped along a helical path from one end to another of the electrode 105 to provide a path for the cooling water to cool the electrode 105. As shown in FIG. 13, in another implementation, the outer electrode 105 can be designed as a single cylinder having tubes 1300 of cooling water wrapped along a helical path along an outer surface 1305 of the electrode 105.

Other Implementations

A number of implementations have been described. Nevertheless, it will be understood that various modifications can be made. Accordingly, other implementations are within the scope of the following claims.

The RF excited laser 100 can be a gas laser using any gain medium that can react to an RF source, such as, for example, Xe, CO, $CO_2$, Rb, or Cs.

For example, in other implementations, a beam-shaping telescope can be integrated onto the laser exit window to produce a high-quality round, symmetrical beam.

The laser resonator can be an unstable resonator.

Figure 14:
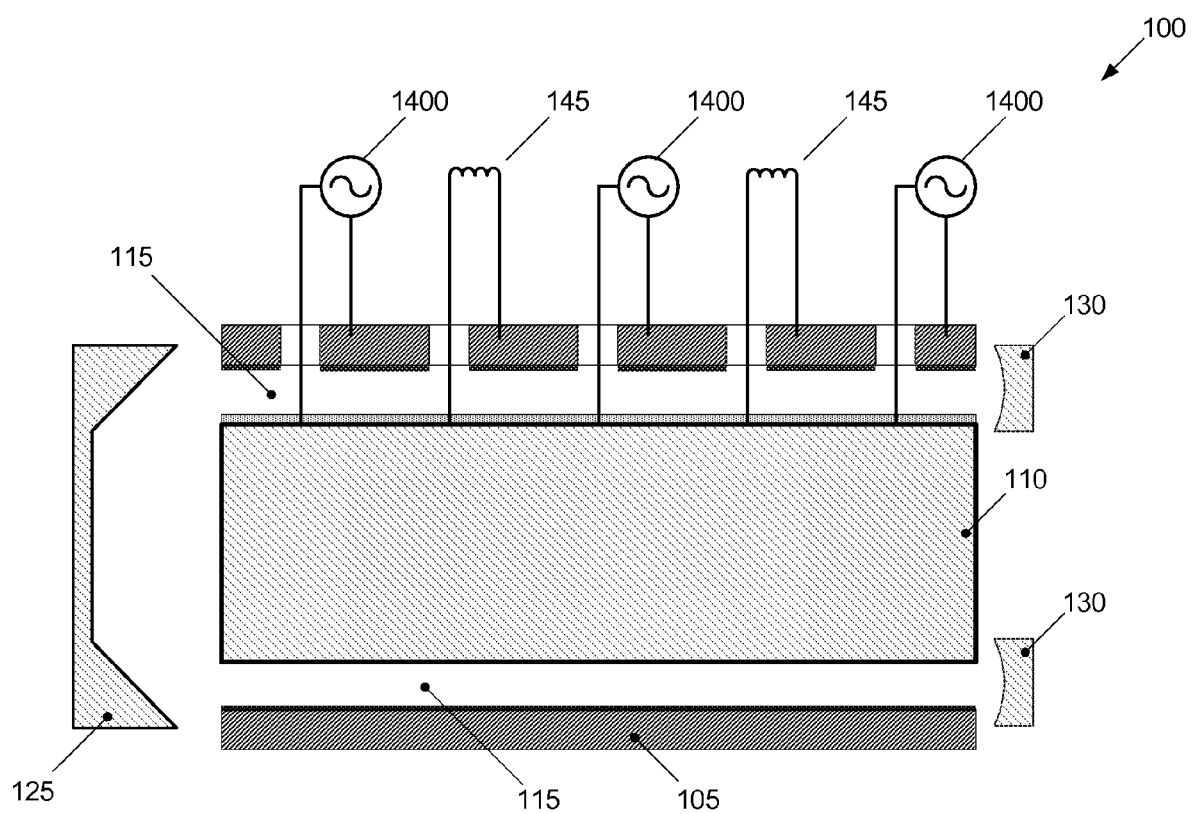
FIG. 14 is a schematic longitudinal cross sectional view of another implementation of the laser of FIGS. 1A and 1B.

Referring to FIG. 14, in another implementation, one or more of the inductor arrangements 140 can be used as RF feedthrough ports in the case where multiple feeds are needed or used instead of a single feed (such as shown in FIG. 2). Such a design can be used in combination with solid state (that is, transistor based) RF generators/modules, with each module 1400 feeding an inductor arrangement 140.

In other implementations, the inductors 145 can be entirely within the vacuum such that they do not extend through a vacuum seal. To arrange the inductors 145 in this manner, the inductors 145 are connected to an inner surface of the outer electrode 105. In this implementation, the connecting system can also be configured to contact an inner surface of the outer electrode 105 and a seal can be provided between the inner surface of the outer electrode 105 and the connecting system.

In other implementations, the distance 810 between adjacent surfaces of the electrodes 105, 110 can be small enough to provide waveguide propagation of a laser within the discharge volume (such that the electrodes 105, 110 act as a waveguide).

Figure 15:
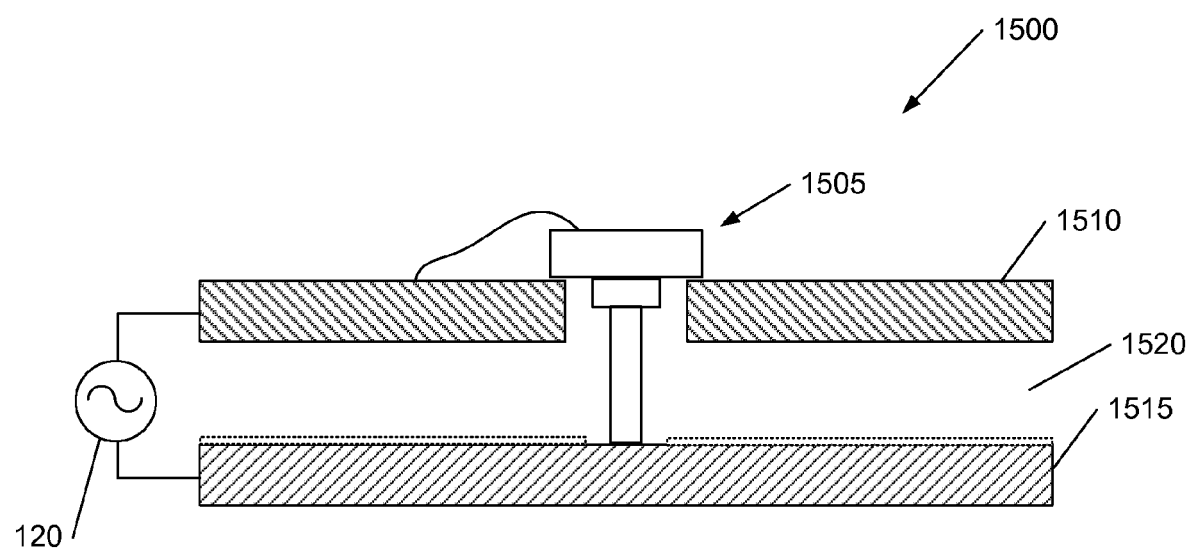
FIG. 15 is a cross sectional view of a planar implementation of the laser of FIGS. 1A and 1B.

Referring also to FIG. 15, in another implementation an RF excited laser 1500 having a planar design includes inductor arrangements 1505 such as the inductor arrangements 140 described above. In this case, the laser 1500 has planar electrodes 1510, 1515 that define a planar inter-electrode gap 1520.

As another example, the lead 360 can be engagingly biased against the outer surface of the outer electrode 105. As another example, the lead 360 can be soldered to the outer surface of the outer electrode 105.

What is claimed is:

1. An RF excited laser assembly comprising:
a pair of opposed electrodes defining an inter-electrode gap that provides a discharge volume for laser light propagation within a gas medium; and
at least one inductor electrically connected to both electrodes and at least partially extending between the electrodes,
wherein the pair of opposed electrodes are configured at the at least one inductor to define a discharge-free region within a laser-free region in the inter-electrode gap, the discharge-free region being a region within the inter-electrode gap accessible to the gas medium but where the gas medium is not excited, and a distance between the electrodes at the discharge-free region is different from portions of the inter-electrode gap where discharge occurs.

2. The laser assembly of claim 1, wherein the laser-free region is a region in which the laser light does not propagate.

3. The laser assembly of claim 1, wherein the electrodes are annular and coaxial such that one electrode is an inner electrode and the other electrode is an outer electrode, and the inter-electrode gap is an annular gap defined between the inner and outer electrodes.

4. The laser assembly of claim 3, wherein the inner electrode is hollow.

5. The laser assembly of claim 1, wherein adjacent surfaces of the electrodes at the discharge-free region are separated by a distance that is large enough to prevent plasma discharge between the outer electrode and the inner electrode within the discharge-free region.

6. The laser assembly of claim 1, wherein the electrodes are separated by a distance that is large enough to provide free space propagation of a beam of laser light within the discharge volume.

7. The laser assembly of claim 1, wherein the electrodes are separated by a distance that provides waveguide propagation of a beam of laser light within the discharge volume.

8. The laser assembly of claim 1 operating at a frequency of about 27 MHz, wherein the at least one inductor defines an inductor spacing of about 0.5 meters.

9. The laser assembly of claim 1, further comprising an RF excitation source electrically connected to both electrodes to generate a discharge within the discharge volume of the inter-electrode gap, wherein the at least one inductor defines an inductor spacing of less than about $1/10^{th}$ of the wavelength at which the RF excitation source operates.

10. The laser assembly of claim 1, wherein the discharge volume houses carbon dioxide.

11. The laser assembly of claim 1, wherein the gap between the electrodes is greater within the discharge-free region than within the discharge volume such that a discharge is prevented from occurring in the discharge-free region.

12. The laser assembly of claim 1, further comprising an excitation source electrically connected to both electrodes to generate a discharge within the discharge volume of the inter-electrode gap.

13. The laser assembly of claim 1, further comprising resonator mirrors mounted at ends of the inter-electrode gap to define a resonator for guiding laser light within the discharge volume.

14. The laser assembly of claim 13, wherein the resonator is an unstable resonator.

15. The laser assembly of claim 1, wherein each of the electrodes of the pair of electrodes is planar.

16. An RF excited laser assembly comprising:
a cylindrical inner electrode;
a cylindrical outer electrode that is coaxial with the cylindrical inner electrode to define an annular inter-electrode gap between the inner and outer electrodes that defines a discharge volume; and
at least one inductor electrically connected to both the inner electrode and the outer electrode and extending between the inner electrode and the outer electrode such that the at least one inductor extends through the inter-electrode gap,
wherein the inner and outer electrodes are configured at the at least one inductor to define a discharge-free region, the at least one inductor extends between the inner electrode and the outer electrode inside of the discharge-free region, the discharge-free region being a region within the inter-electrode gap accessible to the gas medium but where the gas medium is not excited, and a distance between the inner and outer electrodes at the discharge-free region is different from portions of the inter-electrode gap where discharge occurs.

17. The laser assembly of claim 16, wherein the inner electrode is hollow.

18. The laser assembly of claim 16, wherein the electrodes are separated by a distance that is large enough to provide free space propagation of a beam of laser light within the discharge volume.

19. The laser assembly of claim 16, wherein the electrodes are separated by a distance that provides waveguide propagation of a beam of laser light within the discharge volume.

20. The laser assembly of claim 16 operating at a frequency of about 27 MHz, wherein the at least one inductor defines an inductor spacing of about 0.5 meters.

21. The laser assembly of claim 16, further comprising an RF excitation source electrically connected to both electrodes to generate a discharge within the discharge volume of the inter-electrode gap, wherein the at least one inductor defines an inductor spacing of less than about $1/10^{th}$ of the wavelength at which the RF excitation source operates.

22. The laser assembly of claim 16, wherein the discharge volume houses carbon dioxide.

23. The laser assembly of claim 16, further comprising an excitation source electrically connected to both electrodes to generate a laser discharge within the discharge volume of the inter-electrode gap.

24. The laser assembly of claim 16, further comprising resonator mirrors mounted at ends of the inter-electrode gap to define a resonator for guiding laser light within the discharge volume.

25. The laser assembly of claim 24, wherein the resonator is an unstable resonator.

26. The laser assembly of claim 16, wherein the at least one inductor is non-insulated.

27. A method generating a laser discharge, the method comprising:
providing a pair of electrodes defining an inter-electrode gap that provides a discharge volume for laser light propagation within a gas medium, wherein the pair of opposed electrodes define one or more discharge-free regions within a laser-free region in the inter-electrode gap, where the one or more discharge-free regions are regions within the inter-electrode gap accessible to the gas medium but where the gas medium is not excited and a distance between the electrodes at the one or more discharge-free regions is different from portions of the inter-electrode gap where discharge occurs;
providing at least one inductor electrically connected to both electrodes and extending between the electrodes within the inter-electrode gap and inside of the one or more discharge-free regions within the laser-free region; and
generating a laser discharge within the discharge volume such that the at least one inductor does not contact the discharge.

28. The method of claim 27, wherein the at least one inductor is non-insulated.

29. An RF excited laser assembly comprising:
a pair of opposed electrodes defining an inter-electrode gap that provides a discharge volume for laser light propagation within a gas medium, wherein the pair of opposed electrodes define one or more discharge-free regions within a laser-free region in the inter-electrode gap, where the one or more discharge-free regions are regions within the inter-electrode gap accessible to the gas medium but where the gas medium is not excited; and
electrode feedthroughs that each extend from one electrode to the other electrode and through the inter-electrode gap, wherein each electrode feedthrough is configured to be adapted to operate in a first mode in which an inductor electrically connects through the electrode feedthrough to both electrodes to extend between the electrodes within the inter-electrode gap and is configured to be adapted to operated in a second mode in which an RF power source electrically connects through the electrode feedthrough to both electrodes,
wherein a distance between the electrodes at the one or more discharge-free region is different from portions of the inter-electrode gap where discharge occurs.

30. The RF excited laser assembly, wherein at least one of the electrode feedthroughs operates in the first mode and at least one of the electrode feedthroughs operates in the second mode.

31. An RF excited laser comprising:
a pair of opposed electrodes defining an inter-electrode gap that provides a discharge volume for laser light propagation within a gas medium, wherein the pair of opposed electrodes define one or more discharge-free regions within a laser-free region in the inter-electrode gap, where the one or more discharge-free regions are regions within the inter-electrode gap accessible to the gas medium but where the gas medium is not excited;
an excitation source electrically connected to both electrodes to generate a laser discharge within the discharge volume of the inter-electrode gap;
resonator minors mounted at ends of the inter-electrode gap to define a resonator for guiding laser light within the discharge volume; and
at least one inductor electrically connected to both electrodes and extending between the electrodes within the inter-electrode gap and inside of the one or more discharge-free regions within the laser-free region,
wherein a distance between the electrodes at the one or more discharge-free region is different from portions of the inter-electrode gap where discharge occurs.

32. The laser assembly of claim 1, wherein the at least one inductor is exposed to the gas medium.

33. The laser assembly of claim 16, wherein the at least one inductor is exposed to the gas medium.

34. The laser assembly of claim 29, wherein the at least one inductor is exposed to the gas medium.

35. The laser assembly of claim 31, wherein the at least one inductor is exposed to the gas medium.

* * * * *

UNITED STATES PATENT AND TRADEMARK OFFICE
CERTIFICATE OF CORRECTION

PATENT NO. : 7,778,303 B2  Page 1 of 1
APPLICATION NO. : 11/935246
DATED : August 17, 2010
INVENTOR(S) : Francisco J. Villarreal-Saucedo et al.

It is certified that error appears in the above-identified patent and that said Letters Patent is hereby corrected as shown below:

On the Title Page, Item (57) Abstract, Line 7, after "The" and before "least" insert -- at --;

Column 10, Line 52, Claim 13, delete "minors" and insert -- mirrors --;

Column 12, Line 22, Claim 29, delete "operated" and insert -- operate --;

Column 12, Line 26, Claim 29, delete "region" and insert -- regions --;

Column 12, Line 44, Claim 31, delete "minors" and insert -- mirrors --;

Column 12, Line 52, Claim 31, delete "region" and insert -- regions --.

Signed and Sealed this

Sixteenth Day of November, 2010

David J. Kappos
*Director of the United States Patent and Trademark Office*